S. T. LAMB.

Links for Chain Couplings.

No. 5,740. Reissued Jan. 27, 1874.

Witnesses.

Edmund Masson

Inventor.

Salem T. Lamb.

By atty. A. B. Stoughton.

UNITED STATES PATENT OFFICE.

SALEM T. LAMB, OF NEW ALBANY, INDIANA.

IMPROVEMENT IN LINKS FOR CHAIN-COUPLINGS.

Specification forming part of Letters Patent No. 121,225, dated November 21, 1871; reissue No. 5,740, dated January 27, 1874; application filed January 8, 1874.

*To all whom it may concern:*

Be it known that I, SALEM T. LAMB, of New Albany, in the county of Floyd and State of Indiana, have invented certain new and useful Improvements in Links for Chain-Couplings; and that the following is a full, clear, and exact description of the construction and operation of the same, reference being had to the accompanying drawings making a part of this specification, in which—

Figure 1:
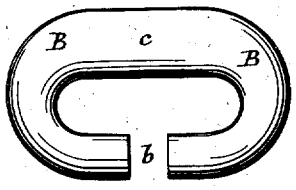
Figure 2:
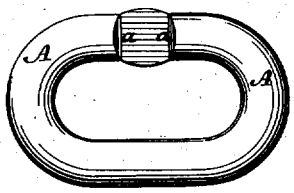
Figure 3:
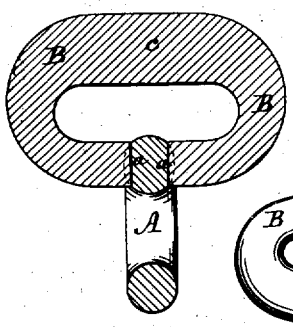
Figure 4:
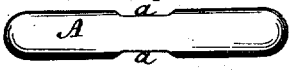
Figure 5:
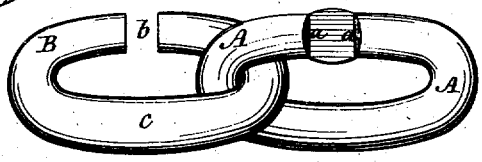

Figure 1 represents a side view of one of the coupling-links, which is an open one. Fig. 2 represents one of the solid or uncut links. Fig. 3 represents the manner of putting the cut and uncut links together, or of slipping one into the other. Fig. 4 represents an edge view of the solid link. Fig. 5 represents the cut and uncut links as they appear in the working chain.

Similar letters of reference, where they occur in the separate figures, denote like parts in all of the drawings.

I am aware that several kinds of links have been devised for coupling chains; but in every case the link must be manipulated or bent to close the opening through which the solid link is passed. I lay no claim to any such links, as they will not run well over ordinary chain-pulleys when the chain is to be so used, and are otherwise inconvenient to use, requiring, when the least overstrained, tools to arrange them.

My invention consists, first, in a link for a chain-coupling, which has a permanent opening or gap through it, for admitting the solid or uncut link of a chain, and which cut or open link will hold the uncut links hooked up by it without bending it or closing the gap, or manipulating the parts of the link, as will be explained. My invention further consists in a chain-coupling composed of solid links and an open link, when said solid links in some portion of them are so made as to slip into or through the gap in the open link, and be held therein without bending or manipulating the open links, as will be explained.

To enable others skilled in the art to make and use my invention, I will proceed to describe the same with reference to the drawings.

The cut or open link is shown at B, and has a slot, opening, or gap, *b*, in or through one of its sides, that will take in the closed or solid link A. The solid or uncut links A are represented as having portions of them reduced, as at *a*, so as to freely pass through the gap *b* in the cut link B. That the solid and cut link may be united, they should be placed in the position shown in Fig. 3, which is the only one in which the link, when reduced as at *a*, can pass into or through the gap in the other, and this position is one that the chain itself could scarcely ever assume, certainly not when in a strained or working position; and the links could only by design or intention be put in that right-angled position, making the accidental uncoupling almost an impossibility. When the links are coupled and straightened out, as in Fig. 5, which is their working position, there is no liability of their uncoupling. That the cut links B may be strengthened to compensate for the slot or gap made in them, they may be made of steel, and made wider at the point or part *c* than elsewhere.

It will be perceived by the drawing that the external form of the cut link B in shape and size conforms with that of the solid links A, so that the chain itself, when coupled by one of the links B, has a general uniformity of links throughout, which will run over sheaves and in their grooves with a regularity that other forms and sizes of coupling-links will not admit of. It will also be perceived by the drawings that the links A and B are what are called "short links"—that is, links whose lengths are about one-third, or a little more, than their widths from out to out.

The principal feature of the cut link B is that it is made of one single piece, has a permanent gap or slot through one of its sides, and that it will take and hold the solid links of a chain without being bent, manipulated, or having the gap closed by any additional piece or part.

The object of this construction of links or chain is to connect a chain if broken, take up the slack, or shorten or lengthen a chain, as may be required, without going to the shop, without using tools, and without liability to part, as with the ordinary open links or rings.

Having thus fully described the nature, object, and purpose of my invention, what I claim therein, as a device for coupling chains, is—

1. The link B, with a slot or gap, *b*, through one of its sides, to receive and hold a solid link without bending or closing, as described.

2. A chain-coupling composed of links A, with depressions *a a*, and link B, with an opening or gap, *b*, made and united in the manner and for the purpose herein described and represented.

SALEM T. LAMB.

Witnesses:
A. B. STOUGHTON,
EDMUND MASSON.